US010764435B2

(12) United States Patent
Deole

(10) Patent No.: US 10,764,435 B2
(45) Date of Patent: Sep. 1, 2020

(54) SMART CUSTOMER ASSISTANT IN A CONTACT CENTER

(71) Applicant: Avaya Inc., Santa Clara, CA (US)

(72) Inventor: Pushkar Yashavant Deole, Pune (IN)

(73) Assignee: Avaya Inc., Santa Clara, CA (US)

( * ) Notice: Subject to any disclaimer, the term of this patent is extended or adjusted under 35 U.S.C. 154(b) by 59 days.

(21) Appl. No.: 16/116,470

(22) Filed: Aug. 29, 2018

(65) Prior Publication Data

US 2020/0076947 A1 Mar. 5, 2020

(51) Int. Cl.
*H04M 3/493* (2006.01)

(52) U.S. Cl.
CPC .................................. *H04M 3/493* (2013.01)

(58) Field of Classification Search
CPC .. H04M 3/493; H04M 3/5191; H04M 3/5183; H04M 3/523
USPC ............. 379/265.09, 265.05, 266.01, 265.11
See application file for complete search history.

(56) References Cited

U.S. PATENT DOCUMENTS

| 6,002,760 A * | 12/1999 | Gisby | H04M 3/48 |
| | | | 379/210.01 |
| 2013/0003957 A1 * | 1/2013 | Singh | H04M 3/493 |
| | | | 379/218.01 |
| 2013/0275164 A1 | 10/2013 | Gruber et al. | |

OTHER PUBLICATIONS

Rosenberg et al. "SIP: Session Initiation Protocol," Network Working Group, Jun. 2002, RFC 3261, 269 pages.

\* cited by examiner

*Primary Examiner* — Thjuan K Addy
(74) *Attorney, Agent, or Firm* — Sheridan Ross P.C.

(57) ABSTRACT

A request to establish a first communication session with a contact center is received. For example, a customer may make a voice call to the contact center. A determination is made that the request to establish the communication session is from an application in a customer communication endpoint. An agent virtual assistant is instantiated. The agent virtual agent works on behalf of a contact center agent. A message is sent to the application in a customer communication endpoint to instantiate a customer virtual assistant. A second communication session is established between the agent virtual assistant and the customer virtual assistant. This allows the contact center agent and the customer to have a better interaction using a simplified graphical user interface that provides the best available information.

20 Claims, 5 Drawing Sheets

SMART CUSTOMER ASSISTANT IN A CONTACT CENTER

FIELD

The disclosure relates generally to contact centers and particularly to using artificial intelligence to manage and route communication sessions in a contact center.

BACKGROUND

As the world moves towards more integration with Artificial Intelligence (AI) systems, today's AI systems (e.g., virtual assistants) are intelligent enough to place voice calls to human beings and converse with them as if they are real humans. Though AI systems currently will not replace actual contact center agents, contact center virtual assistants can be of immense help to a contact center agent during an ongoing communication session (e.g., a voice call).

Today, contact center virtual assistants can understand the conversation between a customer and the contact center agent to provide suggestions to the contact center agent or even do some background work automatically on behalf of the contact center agent. These contact center based virtual assistants can reduce the workload of a contact center/ contact center agent. However, contact center based virtual assistants are limited in their functionality because they don't have access to all aspects of a communication session and are limited in their ability to provide information to the contact center agent in a simplified manner that provides the best information available.

SUMMARY

These and other needs are addressed by the various embodiments and configurations of the present disclosure. A request to establish a first communication session with a contact center is received. For example, a customer may make a voice call to the contact center. A determination is made that the request to establish the communication session is from an application in a customer communication endpoint. An agent virtual assistant is instantiated. The agent virtual assistant works on behalf of a contact center agent. A message is sent to the application in customer communication endpoint to instantiate a customer virtual assistant. A second communication session is established between the agent virtual assistant and the customer virtual assistant. This allows the contact center agent and the customer to have a better interaction using a simplified graphical user interface that provides the best available information.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
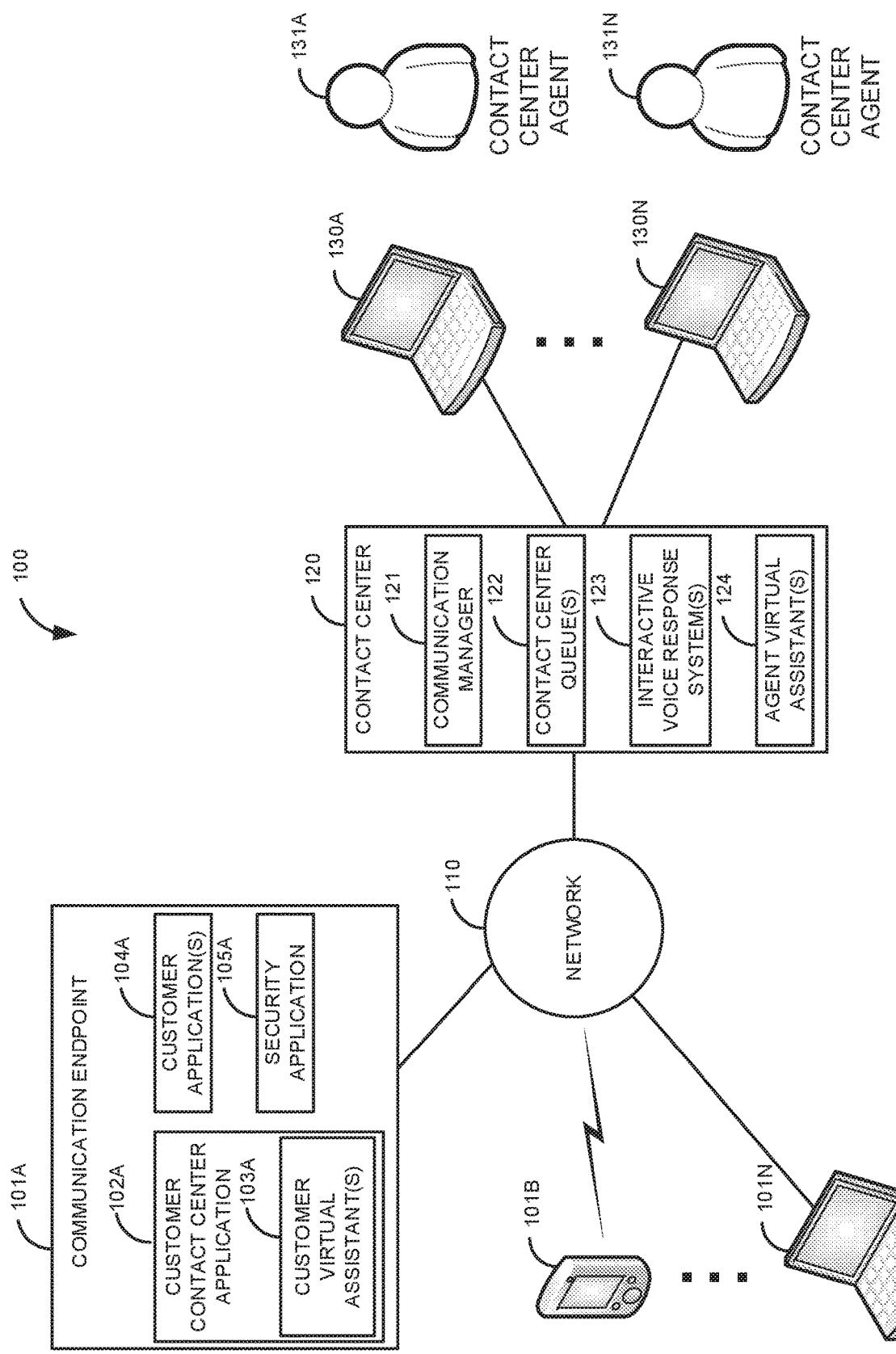
FIG. 1 is a block diagram of a first illustrative system for instantiating a customer virtual assistant for a communication session.

FIG. 1 is a block diagram of a first illustrative system 100 for instantiating a customer virtual assistant 103 for a communication session. The first illustrative system 100 comprises communication endpoints 101A-101N, a network 110, a contact center 120, and agent communication endpoints 130A-130N. In addition, contact center agents 131A-131N are shown that are associated with the agent communication endpoints 130A-130N.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a smartphone, and/or the like. The communication endpoints 101A-101N are devices where a communication sessions ends. The communication endpoints 101A-101N are not network elements that facilitate and/or relay a communication session in the network, such as a communication manager 121 or router. As shown in FIG. 1, any number of communication endpoints 101A-101N may be connected to the network 110.

The communication endpoint 101A comprises a customer contact center application 102A, customer application(s) 104A, and a security application 105A. The customer contact center application 102A is an application that can communicate with the contact center 120. For example, the customer contact center application 102A can be used to initiate different types of communication sessions, such as voice calls, video calls, Instant Messaging communication sessions, text messaging communication sessions, virtual reality communication sessions, email communication sessions, and/or the like with the contact center 120. In addition, the customer contact center application 102A can instantiate the customer virtual assistant(s) 103A. For example, the customer contact center application 102A can instantiate a customer virtual assistant 103A for each active communication session. If the customer has a voice call along with an Instant Messaging session with the contact center 120, there may be two separate instances of the customer virtual assistants 103A. In one embodiment, the customer contact center application 102A may be a real-time instant messaging application or a communication application that integrates with network applications, such as Facebook®, Twitter®, WhatsApp®, and/or the like.

The customer virtual assistant 103A can be or may include any software application that can work in cooperation with the agent virtual assistant 124. In one embodiment, the customer virtual assistant 103A may be a reduced replica of the agent virtual assistant 124 with similar capabilities as the agent virtual assistant 124. The customer virtual assistant 103A may have capabilities, such as, Natural Language Processing (NLP), Natural Language Recognition (NLR), Machine Learning (ML), Artificial Intelligence (AI), and/or the like. The customer virtual assistant 103A may have access (if granted by the customer) to various types of information on the communication endpoint 101A, such as, contact lists, social media applications (e.g., a customer application 104A), and/or the like. The customer virtual assistant 103A may be configured by the customer with other information, such as email addresses, social media handles, telephone number, and/or the like.

The customer application(s) 104A can be or may include any application that the customer can use, such as, an email application, a calendar application, a word processing application, a spreadsheet, a virtual reality application, a gaming application, a graphical drawing application, a browser, a calculator, a document display application, a database application, a security management application, a multimedia application, and/or the like. The customer application(s) 104A may be launched by the customer and/or by the customer contact center application 102A/virtual customer assistant(s) 103A.

The security application 105A can be or may include any software application that can work with the customer virtual assistant 103A. The security application 105A can listen to events/nonfictions being sent to and/or from the customer virtual assistant 103A to identify any security hazard. Using the security application 105A, the customer can decide what information is going to be made available to the customer contact center application 102A/customer virtual assistant(s) 103A. The security application 105A can guide the customer to decide what information is shared or not shared with the customer contact center application 102A/customer virtual assistant 103A. In addition, the security application 105A may decide, at runtime, what information may be shared by the customer virtual assistant 103A with the contact center agent virtual assistant 124. The security application 105A may restrict what types of information that the contact center 120 is allowed to access.

Although not shown for convenience, the communication endpoints 101B-101N may also comprise the customer contact center application 102, the customer virtual assistant(s) 103, the customer application(s) 104, and the security application 105.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and/or the like. The network 110 can use a variety of electronic protocols, such as Ethernet, Internet Protocol (IP), Session Initiation Protocol (SIP), Instant Messaging (IM) protocols, Integrated Services Digital Network (ISDN), and/or the like. Thus, the network 110 is an electronic communication network configured to carry messages via packets and/or circuit switched communications.

The contact center 120 can be, or may include hardware coupled with software that can manage and route communication sessions from the communication endpoints 101A-101N to a contact center queue(s) 122, an Interactive Voice Response (IVR) system(s) 123, the agent communication endpoints 130A-130N and/or the like. The contact center 120 can manage and route various types of communication sessions, such as, voice communication sessions, video communication sessions, email communications, IM communication sessions, text messaging, virtual reality communication sessions, multimedia communication sessions, and/or the like.

The contact center 120 further comprises a communication manager 121, the contact center queue(s) 122, the Interactive Voice Response (IVR) system(s) 123, and agent virtual assistant(s) 124. The communication manager 121 can be or may include any hardware system that uses software to route communications within the contact center 120, such as a Private Branch Exchange (PBX), a central office switch, a router, a proxy server, and/or the like.

The contact center queue(s) 122 can be or may include any computer construct that is used to hold communications/communication sessions that are waiting to be handled by the contact center agents 131A-131N. The contact center queue(s) 122 may hold communication sessions based on a first-in-first-out configuration. Alternatively, the contact center queue(s) 122 may be a pool that holds incoming communications.

The Interactive Voice Response (IVR) system(s) 123 can be or may include any hardware coupled with software that can provide voice interactive responses with a customer or other user. The IVR system(s) 123 may provide a series of voice menus that are used to route incoming voice communications to a contact center queue 122 or agent communication endpoint 130. In one embodiment, the IVR system 123 may be a video IVR system 123.

The agent virtual assistant(s) 124 are a computer process that is started in response to receiving and/or initiating a communication session with the contact center 120. For example, the agent virtual assistant(s) 124 are a separate computer thread or process that is started when an incoming voice call is received in the contact center 120. Since the contact center 120 receives multiple incoming and can make multiple outgoing communication sessions, there may be a multiple agent virtual assistants 124 that are all running concurrently. In one embodiment, the agent virtual assistant(s) 124 may be a software program, a software component, a software module, a combination of multiple threads or processes, and/or the like.

The agent virtual assistant(s) 124 provide a variety of services for the contact center agent, such as, providing contact information, opening applications, requesting information from the customer virtual assistant(s) 103, sending requests to the customer virtual assistant(s) 103, searching the network 110 for information, looking up contact lists, identifying previous communication sessions with a customer, looking up purchase histories of a customer, and/or the like.

The agent communication endpoints 130A-130N can be or may include any hardware coupled with software that can send and/or receive a communication session, such as, a communication endpoint 101. The agent communication endpoints 130A-130N may comprise a plurality of communication endpoints 101. For example, the agent communication endpoints 130A-130N that are used by the contact center agents 131A-131N may comprise a telephone and a desktop computer.

In one embodiment, the customer contact center application 102/customer virtual assistant 103 can work with multiple different contact centers 120. For example, the customer contact center application 102/customer virtual assistant 103 may work with one contact center 120 that provides electronics and a second contact center 120 that provides groceries or a third contact center 120 that provides banking services.

Figure 2:
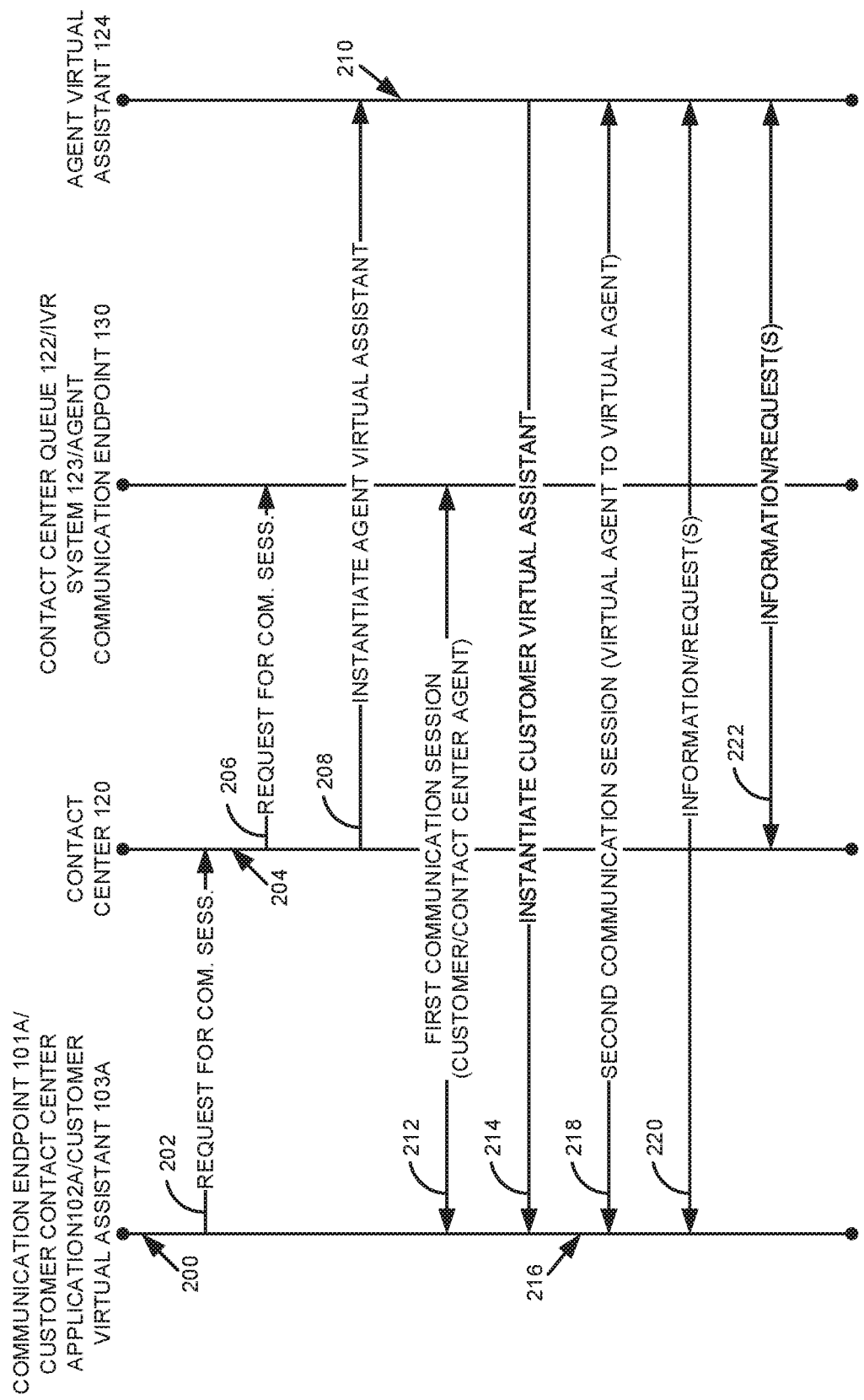
FIG. 2 is a flow diagram of a first process for instantiating a customer virtual assistant for a communication session.
Figure 3:
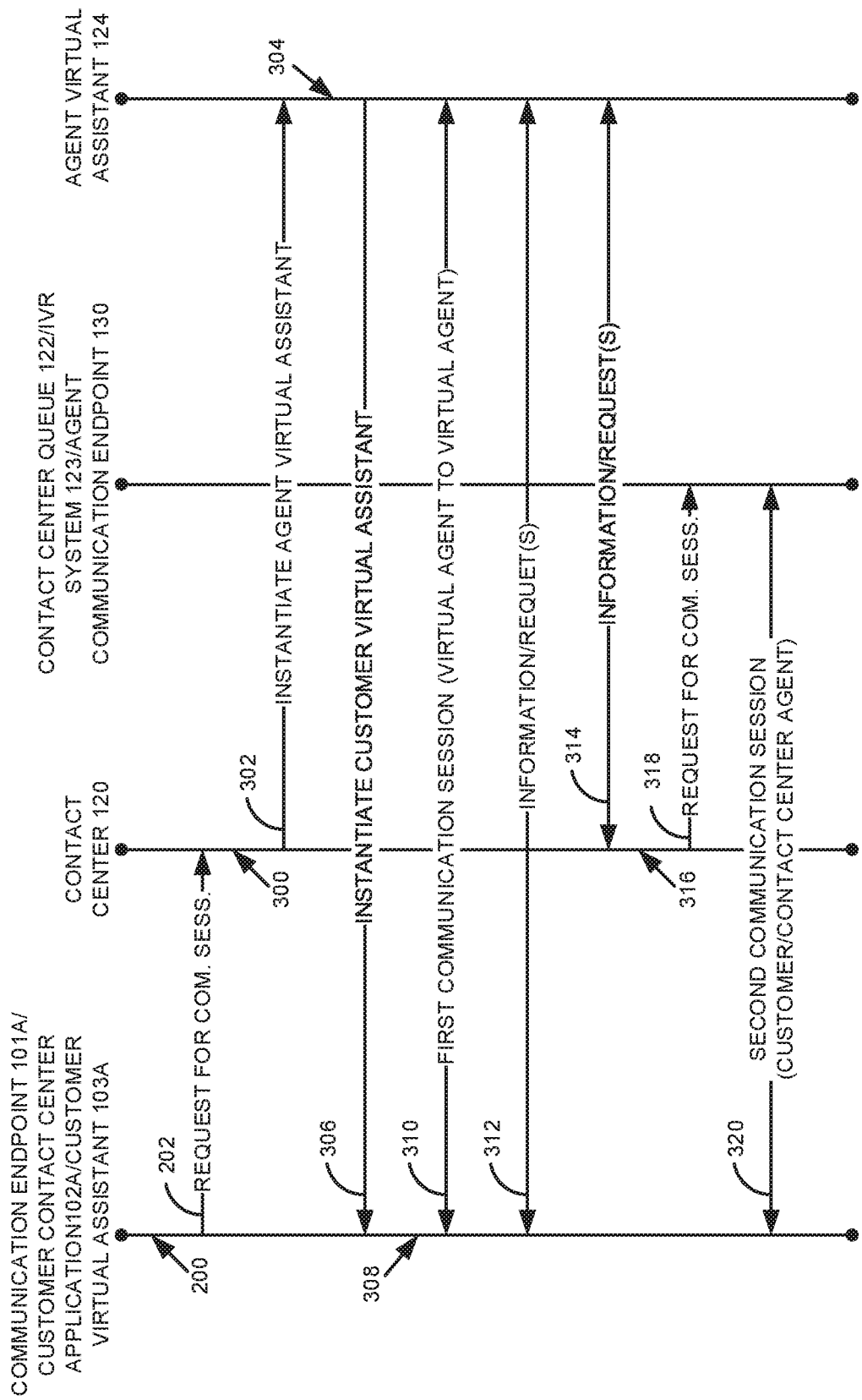
FIG. 3 is a flow diagram of a second process for instantiating a customer virtual assistant for a communication session.
Figure 4:
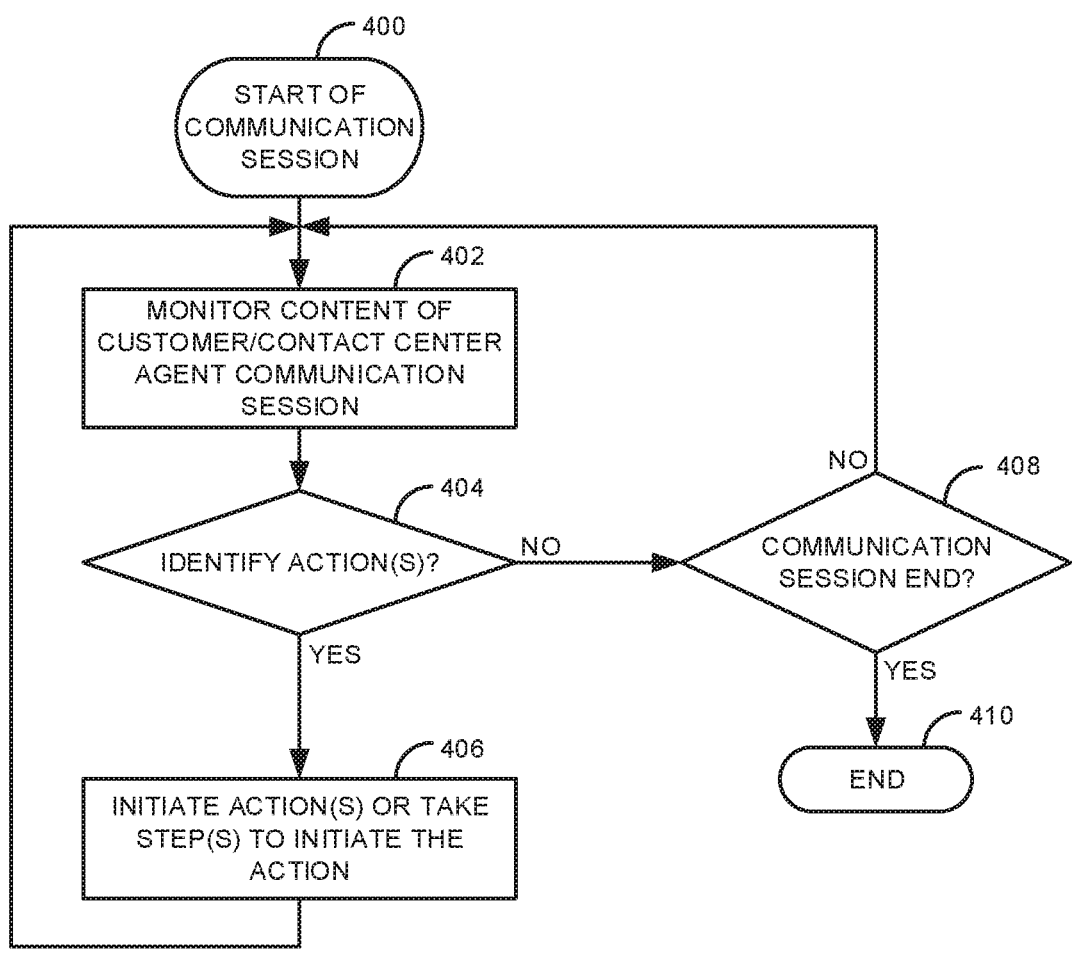
FIG. 4 is a flow diagram of a process for monitoring a communication session from a customer virtual assistant and/or an agent virtual assistant.

FIG. 2 is a flow diagram of a first process for instantiating a customer virtual assistant 103 for a communication session. Illustratively, the communication endpoints 101A-101N, the customer contact center application 102A, the customer virtual assistant(s) 103A, the customer application(s) 104A, the security application 105A, the contact center 120, the communication manager 121, the contact center queue(s) 122, the Interactive Voice Response (IVR systems) 123, the agent virtual assistant(s) 124, and the agent communication endpoints 130A-103N are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts, in step 200, when a customer, at the communication endpoint 101A, starts the customer contact center application 102A. A customer may be any person that communicates with the contact center 120. From the customer contact center application 102A, the customer initiates a request to establish a communication session in step 202. The request to establish the communication session of step 202 is sent to the contact center 120. The request to establish the communication session may be for different types of communication sessions, such as a voice communication session, a video communication session, an Instant Messaging (IM) communication session, a chat communication session, a virtual reality communication session, a multimedia communication session, an email communication session, and/or the like. The request to establish the communication session may be based on one or more protocols, such as Session Initiation Protocol (SIP), H.323, video protocols, IM protocols, email protocols, and/or the like. For example, the request to establish a communication session of step 202 may be a SIP INVITE message. The request to establish the communication session of step 202 may include information that identifies the customer (e.g., a caller ID, telephone number, etc.), information that the request to establish the communication session was sent from the customer contact center application 102A, and/or the like.

The contact center 120 determines, in step 204, if the request to establish the communication session is from the customer contact center application 102A. In addition, the contact center 120 (i.e., the session manager 121) determines how to route the request to establish a communication session within the contact center 120 in step 204. For example, the contact center 120 may use caller identification and/or other information that is in the request to establish the communication session of step 202. The request to establish the communication session of step 202 is sent, in step 206, to a contact center queue 122, an IVR system 123, an agent communication endpoint 130, or the like based on the routing decision of step 204. For example, the request to establish the communication session may be sent to the IVR system 123 in order to gather more information about the caller.

If the request to establish the communication session is from the customer contact center application 102A, the contact center 120 may instantiate the agent virtual assistant 124 in step 208. For example, the contact center 120 starts a separate thread (the agent virtual assistant 124) that runs for the duration (or a portion of the duration) of the communication session. The agent virtual assistant 124 is instantiated to assist the contact center agent 131. In addition, the agent virtual assistant 124 is instantiated so that it can communicate with the customer virtual assistant 103A. The agent virtual assistant 124 may gather information, in step 210, for the contact center agent 131, such as, retrieving data form a database based on a caller identification that was in the request to establish a communication session of step 202.

The first communication session is established, in step 212. For example, a voice communication is initially established with the IVR system 123, which is then transferred to a contact center queue 122 and eventually transferred to an agent communication endpoint 130.

The agent virtual assistant 124 sends a message to the customer contact center application 102A and/or the contact center 120, in step 214, to instantiate the customer virtual assistant 103A in step 214. For example, the contact center 120 may have details to allow the agent virtual assistant 124 to send information to the communication endpoint 101A to instantiate the customer virtual assistant 103A in order to establish the communication session between the customer virtual assistant 103A and the agent virtual assistant 124. The message of step 214 can include information, such as information about the contact center agent 131, information about the contact center 120 (e.g., if the customer contact center application 102/customer virtual assistant 103 can work with multiple contact centers 120), and/or the like. The customer contact center application 102A instantiates the customer virtual assistant 103A in step 216. The customer virtual assistant 103A establishes a second communication session with the agent virtual assistant 124 in step 218. For example, the customer virtual assistant 103A may establish the second communication session with the agent virtual assistant 124 using Transmission Control Protocol (TCP) or User Datagram Protocol (UDP). In one embodiment the second communication session may be encrypted.

Once the second communication session is established in step 218, the customer virtual assistant 103A exchanges information/requests with the agent virtual assistant 124 in step 220. For example, the agent virtual assistant 124 may request that the customer virtual agent 103A provide: location information for the communication endpoint 101A to the agent virtual assistant 124, contact information of the customer to the agent virtual assistant 124, and/or the like that can be displayed to the contact center agent 131. Alternatively, the customer virtual agent 103A may request information from the agent virtual assistant 124, such as, the contact center agent's name, level of expertise, native language, a picture of the contact center agent 131, and/or the like that is displayed to the customer on the communication endpoint 101A.

In addition, the agent virtual assistant 124 may send and/or receive information/request(s) to/from the contact center 120 in step 222. For example, the agent virtual assistant 124 may send a request for the contact center 120 to move the first communication to a higher priority (i.e., a higher position) in the contact center queue 122. Alternatively, the contact center 120 may send a request to the agent virtual assistant 124 to send a message to the customer virtual assistant 103A to display specific information.

The information/requests of steps 220 and 222 may be sent anytime during the duration of the first communication session. For example, at a time after the first communication session is established with a contact center agent 131, the agent virtual assistant 124 may send a message (with a user manual) to the customer virtual assistant 103A to launch a customer application 104A to display the user manual.

FIG. 3 is a flow diagram of a second process for instantiating a customer virtual assistant 103 for a communication session. The process starts, in step 200, when a customer, at the communication endpoint 101A, starts the customer contact center application 102A. From the customer contact center application 102A, the customer initiates a request to establish a communication session in step 202. The request to establish the communication session may identify that it is from the customer contact center application 102A.

The contact center 120 determines in step 300 if the request to establish the communication session of step 202 is from a customer contact center application 102A. If the request to establish the communication session is from the customer contact center application 102A, the contact center 120 instantiates the agent virtual assistant 124 in step 302. In one embodiment, the agent virtual assistant 124 may be already instantiated, instantiated based on receiving the request of step 202, instantiated when the contact center agent 131 logs in, and/or the like. For example, the contact center 120 starts a separate thread/process (the agent virtual assistant 124) that runs for the duration (or a portion of the duration) of the communication session. The agent virtual assistant 124 is instantiated to assist the contact center agent 131. In addition, the agent virtual assistant 124 is instantiated so that it can communicate with the customer virtual assistant 103A. The agent virtual assistant 124 may gather information, in step 304, for the contact center agent 131.

The agent virtual assistant 124 sends a message to the customer contact center application 102A or the contact center 120, in step 306, to instantiate the customer virtual assistant 103A. The message of step 306 can include information, such as information about the contact center agent 131, information about the contact center 120 (e.g., if the customer contact center application 102/customer virtual assistant 103 can work with multiple contact centers 120), and/or the like. The customer contact center application 102A instantiates the customer virtual assistant 103A in step 308. The customer virtual assistant 103A establishes a first communication session with the agent virtual assistant 124 in step 310. For example, the customer virtual assistant 103A may establish the first communication session with the agent virtual assistant 124 using Transmission Control Protocol (TCP), User Datagram Protocol (UDP), and/or other protocols. In one embodiment the first communication session may be encrypted.

Once the first communication session is established in step 310, the customer virtual assistant 103A exchanges information/requests with the agent virtual assistant 124 in step 312. For example, the agent virtual assistant 124 may request that the customer virtual agent 103A provide the customer's contact information. Alternatively, the customer virtual agent 103A may request information from the agent virtual assistant 124, such as, to provide a status of an action (e.g., researching of a problem with a product) based on a previous call to the contact center 120 from the customer.

In addition, the agent virtual assistant 124 may send and/or receive information/request(s) to/from the contact center 120 in step 314. For example, based on receiving the identity of the caller in step 312, the agent virtual assistant 124 may send a request in step 314 to send the request to establish the communication session of step 202 to a specific contact center queue 122, a specific IVR system 123, a specific agent communication endpoint 130, and/or the like.

The contact center 120 determines, in step 316, how to route the request to establish a communication session within the contact center 120. The routing determination of step 316 may be based on information received from the customer virtual assistant 103A and/or the agent virtual assistant 124. For example, based on location information provided by the customer virtual assistant 103A, the contact center 120 (the communication manager 121) may route the request to establish the communication session of step 202 to a different contact center queue 122, IVR system 123, or agent communication endpoint 130.

The request to establish the communication session of step 202 is sent, in step 318, to a contact center queue 122, an IVR system 123, an agent communication endpoint 130, or the like based on the routing decision of step 316. For example, the request to establish the communication session may be sent to a specific agent communication endpoint 130 based on the caller previously having a communication session with a contact center agent 131. The second communication session is established, in step 320. For example, a video communication from the communication endpoint 101A is initially established with a contact center queue 122 and eventually transferred to an agent communication endpoint 130.

The information/requests of steps 312 and 314 may be sent anytime during the duration of the first communication session. For example, at a time after the first communication session is established, the customer virtual assistant 103A may send calendar information of the customer based on a discussion between the contact center agent 131A and the customer.

The processes of FIGS. 2-3 are described where there is only a single communication session between the contact center 120 and the communication endpoint 101A/customer contact center application 102A. However, the process of FIGS. 2-3 will also work where there are multiple communication sessions between the contact center 120 and the communication endpoint 101A/customer contact center application 102A. For example if there are a voice communication session and a IM communication session that are established concurrently from the customer contact center application 102A to the contact center 120, there may be two customer virtual assistants 103A (one for each communication session) running in the communication endpoint 101A and two corresponding agent virtual assistants 124 (one for each communication session) running in the contact center 120. In another embodiment, there may only be single customer virtual assistant 103 and two agent virtual assistants 124.

In addition, the contact center 120 can handle multiple concurrent communication sessions from multiple communication endpoints 101A-101N. For example if there are two voice communication sessions that are established concurrently from the communication endpoints 101A-101B with the contact center 120, there will be a single customer virtual assistant 103 running on each of the communication endpoints 101A-101B and two corresponding agent virtual assistants 124 (one for each communication session) running in the contact center 120.

In FIGS. 2-3, instantiation of the agent virtual assistant 124 (and the corresponding customer virtual agent 103) may occur based on various events, such as, based the customer/contact center agent communication session being established with an IVR system 123 or contact center queue 122, based on receiving the request to establish the customer/contact center agent communication session of step 202, based on establishment of the customer/contact center agent communication session with an agent communication endpoint 130, based on received information, based on a state of the customer/contact center agent communication session, and/or the like.

FIG. 4 is a flow diagram of a process for monitoring a communication session from a customer virtual assistant 103 and/or an agent virtual assistant 124. Once the communication session starts between the customer and the contact center agent 131 in step 400, the customer virtual assistant 103 and/or agent virtual assistant 124 monitors content of the customer/contact center agent communication session in step 402. The content is voice, video, and/or text of the customer/contact center agent communication session (i.e., a media stream) between the customer and the contact center agent 131. In one embodiment, the content does not include messaging to transport the content, such as, Internet Protocol (IP) headers, TCP headers, UDP headers, SIP headers, Session Description Protocol (SDP) headers, Ethernet headers, H.323 headers, and/or the like.

The customer virtual assistant 103 and/or agent virtual assistant 124 can monitor the communication session by using voice to text conversion, NLR, NLP, as well as AI. The converted text (or text of a text based communication session (e.g., IM)) can then be searched in real time for key words, phrases, repetition (e.g., the customer saying the same phrase multiple times), pauses, profanity, sounds (e.g., a dog barking), and/or the like to trigger an action. The voice can be monitored to determine inflection, stress, pitch, unevenness, a weak voice, and/or the like to trigger an action (i.e. as discussed in steps 220, 222, 312, and 314). In addition, video of a communication session can be monitored to identify objects (e.g., people, types of clothing, cars, etc.), gestures, a person shaking, locations, colors, and/or the like to trigger an action. Moreover combinations of the above may be used to identify an action.

The customer virtual assistant 103 and/or agent virtual assistant 124 determines, in step 404, if there is one or more actions to take. The one or more actions may be based on one or more rules. The rules may be predefined rules, rules defined by the customer, rules that are dynamically changed, rules based on machine learning (e.g., Artificial Intelligence (AI)), contact center agent 131 defined rules, and/or the like. An action may be to send information, gather information, launch a customer application 104, remotely control the launched customer application 104, define routing parameters for a communication session, get contact information on other communication medias of the customer (e.g., a IM address), dynamically change one or more IVR menus, display information, provide a warning message (e.g., warning a contact center agent 131 that having a dog barking in the background is against contact center protocols), and/or the like.

If there is not an action identified in step 404, the customer virtual assistant 103 and/or the agent virtual assistant 124 determines, in step 408, if the customer/contact center agent communication session has ended. If the customer/contact center agent communication session has ended in step 408, the process ends in step 410. For example, the thread of the customer virtual assistant 103 and the thread of the agent virtual assistant 124 may be terminated. If the communication session has not ended in step 408, the process goes back to step 402.

Otherwise, if an action has been identified in step 404, the customer virtual assistant 103 and/or the agent virtual assistant 124 initiates the action or takes steps to initiate the action in step 406. For example, if the customer virtual assistant 103 determines that another user has entered the room while the customer is on a voice call with the contact center agent 131, the customer virtual assistant 103 can send information that tells the agent virtual assistant 124 to display the information that another user is now present and can hear the voice call.

Figure 5:
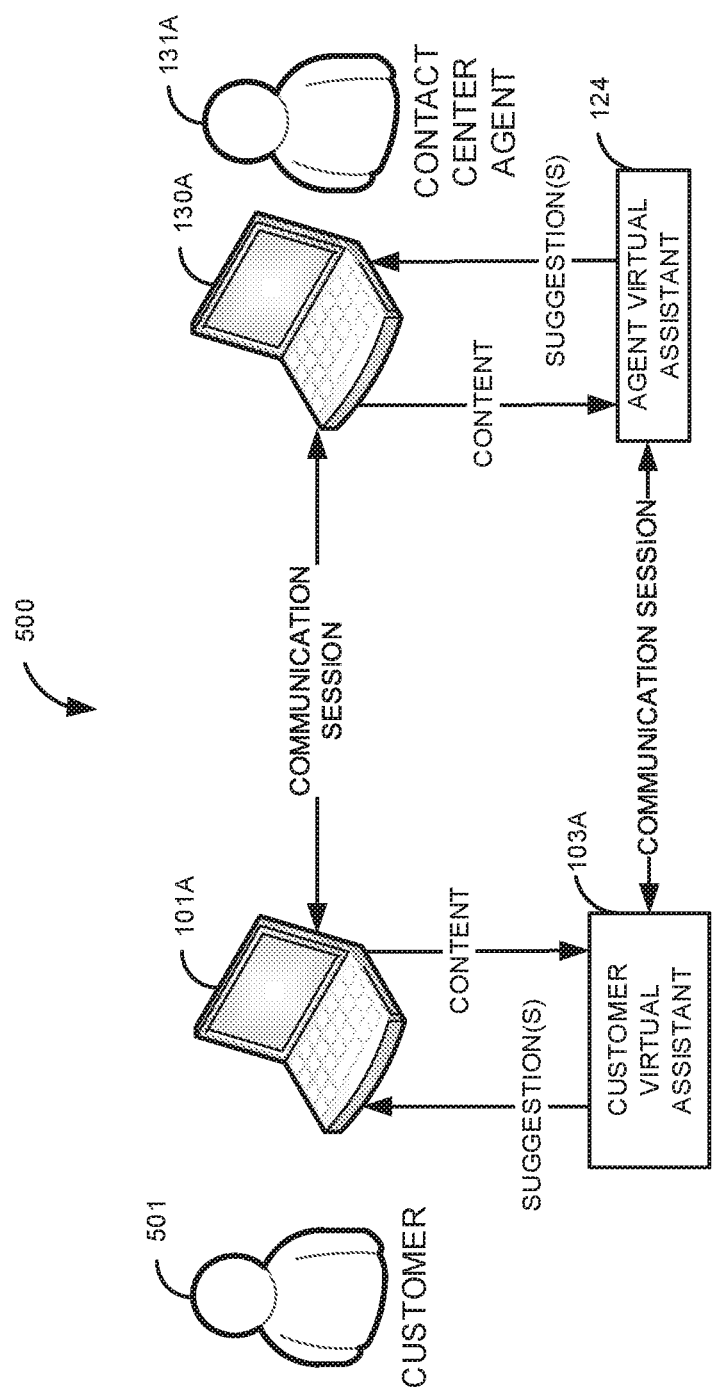
FIG. 5 is a block diagram of an overview of a communication session that uses a customer virtual assistant and an agent virtual assistant.

FIG. 5 is a block diagram 500 of an overview of a communication session that uses a customer virtual assistant 103A and an agent virtual assistant 124. In FIG. 5, a customer 501 has established a communication session from the communication endpoint 101A to the agent communication endpoint 130A. The communication session may be a voice, video, chat, IM, email, virtual reality, multimedia, and/or the like. As discussed above, the customer virtual assistant 103A and the agent virtual assistant 124 have also established a communication session (i.e., in parallel).

During the communication session between the customer 501 and the contact center agent 131A, the customer virtual assistant 103A provides suggestion(s) to the customer 501 via the communication endpoint 101A. In addition, the customer virtual assistant 103A can monitor content (e.g., voice) of the communication session between the communication endpoint 101A and the agent communication endpoint 130A. The customer virtual assistant 103A may provide the suggestions based on the content of the communication session between the customer 501 and the contact center agent 131A, based on rules, based on a request from the agent virtual assistant 124, and/or the like.

The agent virtual assistant 124 can provide suggestions to the contact center agent 131A via the communication agent communication endpoint 130A. The agent virtual assistant 124 can also monitor content of the communication session between the customer and the contact center agent 124. The agent virtual assistant 124 may provide suggestions based on the content of the communication session between the customer 501 and the contact center agent 131A, based on rules, based on a request from the customer virtual assistant 103A, and/or the like.

The processes described above are wherein there is a single contact center 120. However, in other embodiments, the customer contact center application 102/customer virtual assistant 103 may work with multiple contact center 120. For example, the customer contact center application 102/customer virtual assistant 103 may work in communication with an application like Facebook® that allows the user to connect to contact centers 120 of multiple service providers using a defined Application Programming Interface (API) when the user navigates to a specific Facebook® page. When the customer browses to the specific Facebook® page, the customer may elect to establish a communication session (e.g., a voice communication session) using the processes described herein. In another embodiment, the customer contact center application 102A may be itself be a real-time/instant messaging or communication application, such as Facebook®, Twitter®, WhatsApp® that can interface with an existing intelligent assistant such as Alexa™, Cortana™, Google Assistant™, and/or the like. To further illustrate the processes described in FIGS. 1-5, consider the following examples. The following examples are only illustrative examples and are not intended to be limiting to the description provide herein.

In a first example, the customer is calling a 911 contact center 120 using a mobile device (communication endpoint 101). The customer virtual assistant 103 retrieves location information (either on its own accord or based on a request from the agent virtual assistant 124) and sends the location information to the agent virtual assistant 124. The location information is then displayed to the contact center agent 131. This eliminates the extra time required by the contact center agent 131 to ask the customer their current location. This embodiment could be extended to include other types of information, such as determining if the user is shaking (i.e., by an accelerometer in the communication endpoint 101), if the user is bleeding (using a camera), if the user is breathing heavily (using a camera), and/or the like. This information may be used to place the user at a higher location in a contact center queue 122.

In a second example, the customer has established a voice (or video) communication session with the contact center agent 131 and the voice starts breaking up or has some other problem. The agent virtual assistant 124 requests from the customer virtual assistant 103 for additional contact information (e.g., an IM communication handle or email address) from communication endpoint 101. The customer virtual assistant 103 gets the additional contact information, which allows an IM communication session or email session to be established (which may be more reliable). This allows the contact center agent 131 to convey information to the customer that can be sent through an established digital channel that is separate from the voice communication session.

In a third example, the contact center agent 131 mentions, during the communication session, a product manual. The customer virtual assistant 103 and/or the agent virtual assistant 124) recognizes that it may be helpful to display the manual (along with the necessary section indexed to or highlighted) to the customer. The customer virtual assistant 103 can request the manual from the agent virtual assistant 124, receive the manual from the agent virtual assistant 124, and then display the manual with the indexed/highlighted section. Alternatively, the customer virtual assistant 103 may just display that manual with the indexed/highlighted section if the manual is already on the communication endpoint 101. Alternatively, the agent virtual assistant 124 may make the determination and send the manual to the customer virtual assistant 103 for display to the user.

In a fourth example, the agent virtual assistant 124 may request location information of the customer. If the location information indicates that the customer is at home, the customer/contact center agent communication session is routed to a first contact center queue, 122, IVR system 123, or agent communication endpoint 130 because the call is likely not work related (this may be based on a previous history). For example, the customer's purchase history may indicate that the customer is typically interested in consumer products (e.g., televisions) when calling from home and computer servers when calling from work. If the customer's location is at work, the customer/contact center agent communication session is routed to a second contact center queue 122, IVR system 123, or agent communication endpoint 130 because the communication session is likely work related.

In a fifth example, the customer is initially connected to an IVR system 123. From a menu on the IVR system 123, the customer selects a specific product. The agent virtual assistant 123 determines that the customer should see an advertisement and/or manual for the selected product. The agent virtual assistant 124 gets the advertisement and/or manual and sends the advertisement and/or manual to the customer virtual assistant 103. The customer virtual assistant 103 then displays the advertisement and/or manual to the customer (e.g., using a completely separate customer application 104).

In a sixth example, when the customer/contact center agent communication session is established, the agent virtual assistant 124 sends information to the customer virtual assistant 103, such as, the contact center agent's name, technical expertise, and/or the like. The customer virtual assistant 103 then displays the contact center agent's information to the customer.

In a seventh example, the customer virtual assistant 103 detects another user (e.g., via a camera) has entered into the room or has been conferenced onto the communication session. The customer virtual assistant 103 then notifies that to agent virtual assistant 124, which then displays this information to the contact center agent 131.

In an eight example, once the customer/contact center agent communication session is established (or before the communication session is established), the customer virtual assistant 103 looks up calendar information for the customer. If there is a meeting that is upcoming (e.g., in the next 15 minutes), the customer virtual assistant 103 sends the calendar information (e.g., just that there is an upcoming meeting of the customer) to the agent virtual assistant 124. The agent virtual assistant 124 then displays the calendar information to the contact center agent 131. In one embodiment, the ability to search the calendar by the customer virtual assistant 103 may be limited to only a defined amount of time (e.g., in the next 30 minutes).

In a ninth example, the customer calls the contact center 120 about a customer application 104 that is installed on the communication endpoint 101. The agent virtual assistant 124 sends a request to the customer virtual assistant 103 to allow access and launch the customer application 104. In one embodiment, the contact center agent 131 may also be given the ability to remotely control the customer application 104 to provide assistance to the customer.

In a tenth example, the request to establish the communication session (i.e., step 202) is to establish a second communication session with the contact center 120. For example, the customer may have previously called the contact center 120 regarding a problem with a newly purchased television, which was not fully resolved. The customer virtual assistant 103 sends information about the first communication session (e.g., a summary or notes taken by the customer regarding the customer's previous call to the contact center 120) to the agent virtual assistant 124. The agent virtual assistant 124 then displays the information to the contact center agent 131.

In an eleventh example, the agent virtual assistant 124 requests information about the customer. The customer information may be the customer's name, address, location, language, contact lists, preference status (e.g., a gold customer or a customer that purchases a lot of products from the contact center 120), and/or the like. In addition, the customer information may include information related to the type of communication endpoint 101 (e.g., a mobile device), the location of the communication endpoint 101, bandwidth capabilities of the communication endpoint 101, and/or the like. Upon receiving the customer information, the agent virtual assistant 124 routes the communication session to a specific IVR system 123 (or contact center queue 122/agent communication endpoint 130). In addition, the agent virtual assistant 124 may dynamically change one or more of the IVR menus (e.g., to simplify the menus based on the customer information).

In many of the above examples, providing a simplified user interface with only the necessary information to the customer and/or contact center agent 131 makes the customer interaction a better experience (i.e., it takes less time and uses less contact center resources) than in the prior art(s).

The above description is describes where there is a contact center 120 that is involved in the communication session between the customer and the contact center agent 131 and the communication session between the customer virtual assistant 103 and the agent virtual assistant 124. However, in one embodiment, the processes described above can work where there is not a contact center 120. For example, the process described above can work where two friends/persons are communicating without a contact center 120.

In this scenario, the agent virtual assistant 124 is in the agent communication endpoint 130 (which would be more like the communication endpoint 101). The agent virtual assistant 124 works similar to the customer contact center application 102/customer virtual assistant 103 and communicates in a peer-to-peer mode with the customer virtual assistant 103. The customer contact center application 102 would be a peer-to-peer application instead of a contact center application.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   receiving a request to establish a first communication session with a contact center;
   determining that the request to establish the first communication session is from an application in a customer communication endpoint;
   instantiating an agent virtual assistant;
   sending a message to the application in a customer communication endpoint to instantiate a customer virtual assistant; and
   establishing a second communication session between the agent virtual assistant and the customer virtual assistant.

2. The method of claim 1, wherein the message to instantiate the customer virtual assistant is based on the determining that the request to establish the first communication session is from the application in the customer communication endpoint.

3. The method of claim 1, wherein the agent virtual assistant receives information from the customer virtual assistant in the second communication session that is different from information received in the first communication session.

4. The method of claim 1, wherein the message to instantiate the customer virtual assistant is sent prior to the establishing the second communication session.

5. The method of claim 1, wherein prior to the establishing the second communication session, the agent virtual assistant sends the message to instantiate the customer virtual assistant.

6. The method of claim 1, wherein the customer virtual assistant monitors content of the first communication session and based on the monitored content of the first communication session the customer virtual assistant changes information displayed on the customer communication endpoint.

7. The method of claim 1, wherein
   the agent virtual assistant exchanges requests with the customer virtual assistant in the second communication channel and wherein at least some of the requests are not present in the first communication session.

8. The method of claim 1 wherein, based on a response to a request received in the second communication session, the agent virtual assistant displays information to a contact center agent using an agent communication endpoint.

9. The method of claim 1, wherein the agent virtual assistant sends information to the customer virtual assistant in the second communication session that is displayed to the customer.

10. The method of claim 1, further comprising:
    receiving, from the customer virtual assistant, in the second communication session, calendar information that identifies an upcoming meeting of the customer; and
    displaying the calendar information to a contact center agent involved in the first communication session.

11. A system comprising:
    a microprocessor; and
    a computer readable medium, coupled with the microprocessor and comprising microprocessor readable and executable instructions that program the microprocessor to:
      receive a request to establish a first communication session with a contact center;
      determine that the request to establish the first communication session is from a customer contact center application in a customer communication endpoint;
      instantiate an agent virtual assistant;
      send a message to the customer contact center application to instantiate a customer virtual assistant; and
      establish a second communication session between the agent virtual assistant and the customer virtual assistant.

12. The system of claim 11, wherein the agent virtual assistant is instantiated based on one or more of:
    (i) the first communication session being placed into a contact center queue;
    (ii) the first communication session being established with an Interactive Voice Response (IVR) system;
    (iii) the first communication session being established with an agent communication endpoint; or
    (iv) receiving the request to establish the first communication session.

13. The system of claim 11, wherein the agent virtual assistant receives information from the customer virtual assistant in the second communication session that causes the first communication session to be placed at a higher priority in a contact center queue.

14. The system of claim 11, wherein the agent virtual assistant receives information from the customer virtual assistant in the second communication session that changes routing of the first communication session in the contact center.

15. The system of claim 14, wherein the changed routing of the first communication session is to at least one of: an Interactive Voice Response (IVR) system, a contact center queue, and a specific contact center agent terminal.

16. The system of claim 11, wherein the customer virtual assistant and/or the agent virtual assistant monitors content of the first communication session and, based on the monitored content of the first communication session, the customer virtual assistant at least one of: provides a document to a customer on the customer communication endpoint, displays a message to the customer on the customer communication endpoint, and launches another application on behalf of the customer on the customer communication endpoint.

17. The system of claim 11, wherein the microprocessor readable and executable instructions further program the microprocessor to:
    send a request for information to the customer virtual assistant; and
    receive the information from the customer virtual assistant.

18. The system of claim 17, wherein based on receiving the information from the customer virtual assistant at least one of:
    (i) displays the information to a contact center agent using an agent communication endpoint;
    (ii) switches the first communication session to a third communication session that uses a different communication media;
    (iii) displays information of a previous communication session using the agent communication endpoint; and
    (iv) changes one or more menus on an Interactive Voice Response (IVR) system.

19. The system of claim 11, wherein the microprocessor readable and executable instructions further program the microprocessor to:
    receive, from the customer virtual assistant, in the second communication session, calendar information that identifies an upcoming meeting of the customer; and
    display the calendar information to a contact center agent involved in the first communication session.

20. A method comprising:
    sending, from a customer contact center application in a communication endpoint, a request to establish a first communication session with a contact center;
    receiving a message from an instantiated agent virtual assistant in the contact center to instantiate a customer virtual assistant;
    instantiating the customer virtual assistant; and
    establishing a second communication session between the instantiated agent virtual assistant and the instantiated customer virtual assistant.

* * * * *